United States Patent
Gao et al.

(10) Patent No.: US 10,904,892 B2
(45) Date of Patent: Jan. 26, 2021

(54) BEAMFORMING METHOD AND APPARATUS

(71) Applicant: HUAWEI TECHNOLOGIES CO., LTD., Shenzhen (CN)

(72) Inventors: Quanzhong Gao, Shanghai (CN); Chaoyi Yan, Shenzhen (CN); Chen Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/423,180

(22) Filed: May 28, 2019

(65) Prior Publication Data
US 2019/0281607 A1    Sep. 12, 2019

Related U.S. Application Data

(63) Continuation of application No. PCT/CN2016/108056, filed on Nov. 30, 2016.

(51) Int. Cl.
*H04W 72/08*    (2009.01)
*H04L 5/00*    (2006.01)
(Continued)

(52) U.S. Cl.
CPC ........ *H04W 72/085* (2013.01); *H04B 7/0408* (2013.01); *H04B 7/0695* (2013.01);
(Continued)

(58) Field of Classification Search
CPC ...... H04B 7/0615; H04B 7/0617; H04B 7/17; H04B 7/24; H04B 7/309–336; H04B 7/382; H04L 5/0048; H04L 5/005
See application file for complete search history.

(56) References Cited

U.S. PATENT DOCUMENTS

2009/0046582 A1    2/2009    Sarkar et al.
2013/0064215 A1    3/2013    Gao et al.
(Continued)

FOREIGN PATENT DOCUMENTS

CN    101779387 A    7/2010
CN    104521155 A    4/2015
(Continued)

OTHER PUBLICATIONS

Huawei, HiSilicon: "Coverage Issues of Massive MIMO in NR", 3GPP TSG RAN WG1 Meeting #85, R1-164372, Nanjing, China, May 23-27, 2016. total 6 pages. XP051096486.
(Continued)

*Primary Examiner* — Pao Sinkantarakorn
(74) *Attorney, Agent, or Firm* — Kilpatrick Townsend & Stockton LLP (57) ABSTRACT

A beamforming method and apparatus are disclosed, to expand coverage of a PDCCH in a particular direction, and improve demodulation performance of the PDCCH. Under this method, a cell-specific reference signal CRS wide beam can be combined by a base station with N CRS narrow beams to form N CRS composite beams. A first beam can be selected by the base station from the N CRS composite beams. Beamforming processing can be performed by the base station on a physical downlink control channel (PDCCH) based on a weight of the first beam to form a second beam. The first beam and the second beam can be sent.

10 Claims, 10 Drawing Sheets

(51) Int. Cl.
*H04W 72/04* (2009.01)
*H04B 7/06* (2006.01)
*H04B 7/0408* (2017.01)

(52) U.S. Cl.
CPC ........... *H04L 5/005* (2013.01); *H04W 72/046* (2013.01); *H04W 72/0446* (2013.01)

(56) References Cited

U.S. PATENT DOCUMENTS

| | | | |
|---|---|---|---|
| 2015/0124688 A1* | 5/2015 | Xu | H04B 7/0617 370/312 |
| 2016/0006122 A1 | 1/2016 | Seol et al. | |
| 2017/0180064 A1 | 6/2017 | Su et al. | |
| 2017/0214505 A1* | 7/2017 | Zhang | H04B 7/0617 |
| 2017/0311301 A1 | 10/2017 | Yu et al. | |
| 2018/0006784 A1 | 1/2018 | Su | |
| 2018/0262919 A1 | 9/2018 | Peng et al. | |

FOREIGN PATENT DOCUMENTS

| | | |
|---|---|---|
| CN | 104885377 A | 9/2015 |
| CN | 105940616 A | 9/2016 |
| CN | 105991175 A | 10/2016 |
| WO | 2015024204 A1 | 2/2015 |
| WO | 2015115776 A1 | 8/2015 |
| WO | 2015124072 A1 | 8/2015 |

OTHER PUBLICATIONS

NTT DOCOMO: "CSI Acquisition Schemes for NR", 3GPP TSG RAN WG1 Meeting #87, R1-1612730, Lisbon, Portugal Oct. 10-14, 2016, XP051176673.

Huawei, HiSilicon: "Motivations and Considerations on Massive MIMO for New RAT", 3GPP TSG RAN WG1 Meeting #85, R1-164038, Nanjing, China, May 23-27, 2016. total 6 pages. XP051096627.

Yulin Iuo: "Research on Pilot Design and MIMO Detection Technology in Downlink of LTE-A System", 2012, total 78 pages.

\* cited by examiner

CRS-BF-1

FIG. 5a

CRS-BF-2

FIG. 5b

CRS-BF-3

FIG. 5c

CRS-BF-4

FIG. 5d

CRS-BF-5

FIG. 5e

CRS-BF-6

BEAMFORMING METHOD AND APPARATUS

CROSS-REFERENCE TO RELATED APPLICATIONS

This application is a continuation of International Application No. PCT/CN2016/108056, filed on Nov. 30, 2016, the disclosure of which is hereby incorporated by reference in its entirety.

TECHNICAL FIELD

This application relates to the field, and in particular, to a beamforming method and apparatus.

BACKGROUND

Massive multiple-input multiple-output (Massive Multiple-Input Multiple-Output, massive MIMO) can significantly expand a system capacity with an increase in an antenna quantity. Therefore, massive MIMO is a very important technology for obtaining a high-capacity gain. In a massive MIMO system, a base station generates, on a data channel by using a beamforming technology and a plurality of antennas, narrow beams aligned with users, to improve data channel transmission quality of the user, and expand cell coverage.

Figure 1A:
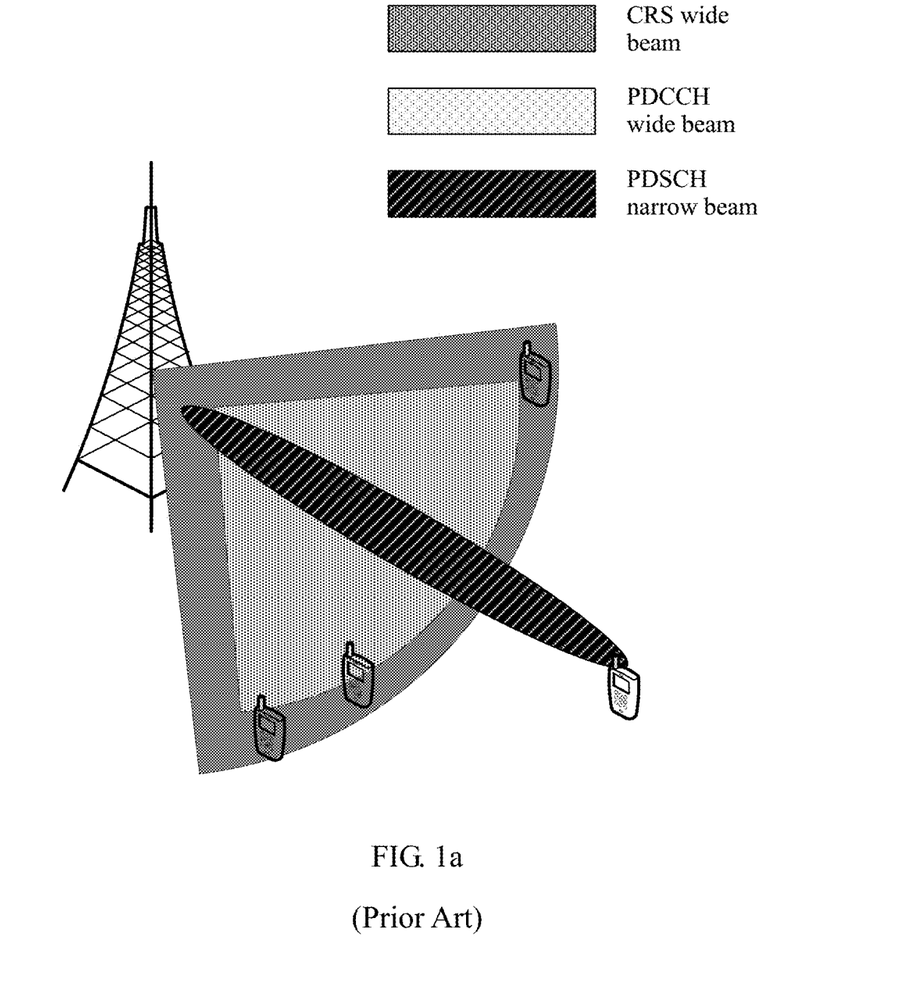
FIG. 1a is a first schematic diagram of cell beam coverage in the prior art.
Figure 1B:
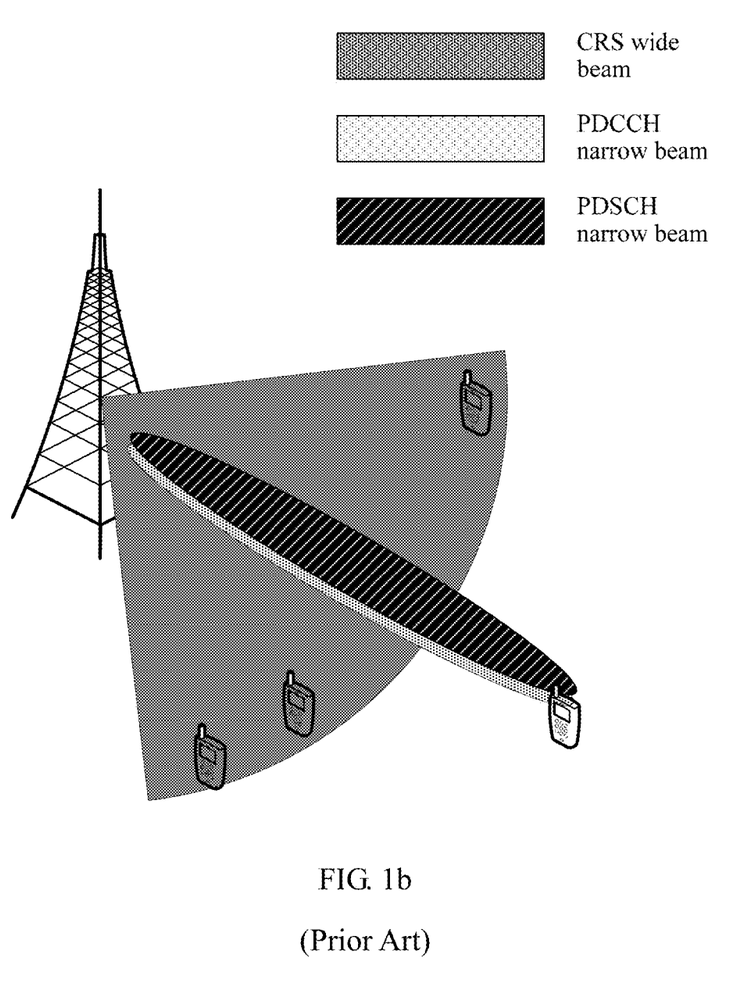
FIG. 1b is a second schematic diagram of cell beam coverage in the prior art.

As shown in FIG. 1a, in the massive MIMO system, a narrow beam aligned with a user in a particular direction is generated by using the beamforming technology on a cell channel, namely, a physical downlink shared channel (Physical Downlink Shared Channel, PDSCH), thereby improving data channel transmission quality of the user. However, coverage of the PDSCH in the direction exceeds coverage of a cell-specific reference signal (Cell-specific Reference Signal, CRS) wide beam. Because data transmission performed by the user on the PDSCH needs to be scheduled by using scheduling signaling carried on a PDCCH, a coverage capability of the PDCCH needs to be improved to ensure that a user outside the coverage of the CRS wide beam can be normally scheduled. As shown in FIG. 1b, in a current method, narrow beam weighting is performed on the PDCCH to obtain coverage in a particular direction that is better than coverage obtained after CRS wide beam weighting is performed, to meet a scheduling requirement for the data channel of the user in the direction.

Figure 2:
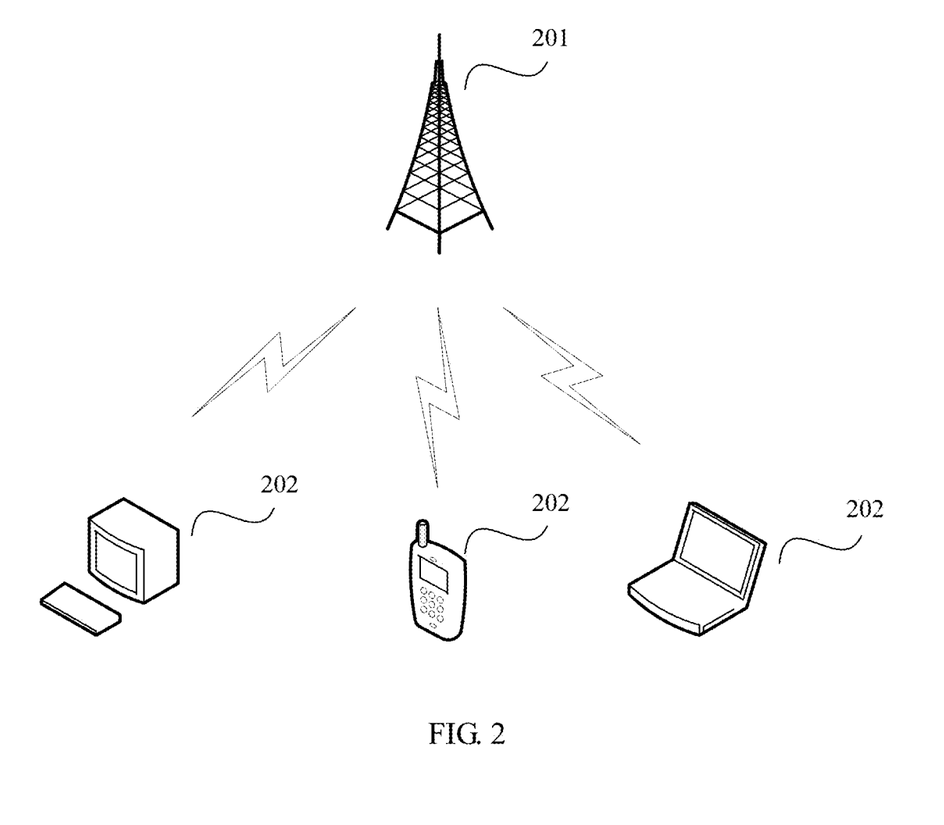
FIG. 2 is a schematic diagram of a system architecture according to an embodiment of this application.

In a beam coverage manner shown in FIG. 2, after narrow beam weighting is performed on a PDCCH, coverage of the PDCCH in a particular direction exceeds coverage of a CRS wide beam although coverage of the PDCCH matches coverage of a PDSCH narrow beam. If the coverage of the PDCCH exceeds an area of a CRS, the CRS signal cannot be correctly estimated. For demodulation of the PDCCH channel, channel estimation needs to be performed based on the CRS. Therefore, if the coverage of the PDCCH exceeds the area of the CRS, channel quality of the CRS cannot ensure a PDCCH demodulation threshold. Consequently, a loss of demodulation performance of the PDCCH is caused, and beamforming performance of the PDCCH also deteriorates.

SUMMARY

This application provides a beamforming method and apparatus, to resolve a problem of deterioration of demodulation performance of a PDCCH that is caused when coverage of the PDCCH in a particular direction exceeds coverage of a CRS beam after narrow beam weighting is performed on the PDCCH.

According to a first aspect, a beamforming method is provided. A weight of a CRS wide beam is superposed with a weight of a narrow beam to obtain a composite beam; and beamforming processing is performed on a PDCCH based on a weight of the composite beam, to expand coverage of the PDCCH in a particular direction, and resolve a problem of deterioration of demodulation performance of the PDCCH that is caused when the coverage of the PDCCH in the particular direction exceeds coverage of a CRS beam and phases of the PDCCH and a CRS are inconsistent.

In a possible design, the base station pre-generates N CRS narrow beams based on the weight of the CRS wide beam; combines each pre-generated CRS narrow beam with the CRS wide beam to form N CRS composite beams in total; selects a first beam from the N CRS composite beams, and performs beamforming processing on the PDCCH based on a weight of the first beam to form a second beam; and sends the first beam and the second beam, where N≥1 and N is a positive integer. In this way, a case in which the coverage of the PDCCH exceeds the coverage of the CRS is avoided; coverage of a PDCCH beam sent by the base station is the same as that of a CRS beam; and for demodulation of the PDCCH, channel estimation can be totally performed based on the CRS, thereby improving the demodulation performance of the PDCCH.

In a possible design, the combining one pre-generated CRS narrow beam with the CRS wide beam to form one CRS composite beam includes: setting a power ratio of the CRS narrow beam to the CRS wide beam; setting a first linear factor and a second linear factor based on the power ratio; performing linear superposition on a weight of the CRS narrow beam and a weight of the CRS wide beam based on the first linear factor and the second linear factor, to obtain a weight of the CRS composite beam; and generating the CRS composite beam based on the weight of the CRS composite beam.

In a possible design, the base station may select the first beam from the N CRS composite beams in the following manner: The base station determines a CRS narrow beam on which each to-be-scheduled terminal is located, and establishes a correspondence between a terminal and a CRS narrow beam; and the base station selects, from at least one to-be-scheduled terminal, a terminal with worst PDCCH signal quality that is denoted as a first terminal, and determines, based on the correspondence, a first CRS narrow beam corresponding to the first terminal; and selects, as the first beam, a CRS composite beam formed by combining the first CRS narrow beam with the CRS wide beam. In this way, a coverage gain obtained within the first beam by the terminal with the worst PDCCH signal quality in the to-be-scheduled terminal is increased, so that an entire system service capacity can be expanded.

In a possible design, after determining, based on the correspondence, the first CRS narrow beam corresponding to the first terminal, the base station determines target reference signal received power RSRP of the first terminal, and adjusts a power ratio of the first CRS narrow beam to the CRS wide beam when the target CRS composite beam is formed through combination, until RSRP of the first terminal on the CRS composite beam formed by combining the first CRS narrow beam with the CRS wide beam is greater than or equal to the target RSRP.

In a possible design, the base station determines a correspondence between any terminal in the at least one to-bescheduled terminal and a CRS narrow beam in the following manner: calculating signal strength of the any terminal on each CRS composite beam, and determining that there is a correspondence between the any terminal and a CRS narrow beam for forming a CRS composite beam corresponding to maximum signal strength.

In a possible design, the base station performs the following operations on each terminal in a set of to-be-scheduled terminals: obtaining a channel response; calculating RSRP of the terminal on each CRS composite beam based on the channel response and a weight of each CRS composite beam to obtain N RSRP values; selecting a maximum value from the N RSRP values; and determining that the terminal is corresponding to a CRS narrow beam for forming a CRS composite beam corresponding to the maximum value.

In a possible design, the base station may select the first beam from the N CRS composite beams in the following manner: The base station calculates PDCCH occupation resources that are of each CRS composite beam and that are used for the at least one terminal; and selects a CRS composite beam corresponding to minimum PDCCH occupation resources as the first beam. In this way, PDCCH resources occupied by a scheduled terminal can be reduced, so that a total quantity of scheduled terminals can be increased, thereby expanding a PDCCH capacity of the system.

In a possible design, the base station traverses the N CRS composite beams; and each time the base station selects one CRS composite beam, the base station calculates a difference between first PDCCH occupation resources that are of the selected CRS composite beam and that are used for all terminals in the set of to-be-scheduled terminals and second PDCCH occupation resources that are of the CRS wide beam and that are used for all the terminals in the set of to-be-scheduled terminals, to obtain N differences; and the base station uses a CRS composite beam corresponding to a maximum value in the N differences as the first beam.

In a possible design, when calculating PDCCH occupation resources that are of any CRS composite beam and that are used for the at least one terminal, the base station specifically calculates a beam gain obtained by each of the at least one terminal on the any CRS composite beam; and calculates, based on the obtained beam gain, PDCCH occupation resources that are of the any CRS composite beam and that are used for all terminals in the at least one terminal.

In a possible design, the base station reselects, as the first beam, a CRS composite beam from the N CRS composite beams based on a specified period, to adapt to mobility of the terminal, track a location of the terminal, and more accurately update the first beam.

According to a second aspect, a beamforming apparatus is provided. The beamforming apparatus has a function of implementing behavior of the base station according to any one of the first aspect and the possible implementations of the first aspect. The function may be implemented by using hardware, or may be implemented by executing corresponding software by hardware. The hardware or the software includes one or more modules corresponding to the foregoing function.

According to a third aspect, a base station is provided. The base station includes a transceiver, a processor, and a memory. The processor is connected to the memory through a bus system. The processor is configured to execute code in the memory. When the code is executed, the processor performs the method according to any one of the first aspect or the possible implementations of the first aspect.

According to a fourth aspect, a computer storage medium is provided. The computer storage medium is configured to store a computer program, and the computer program includes an instruction used to perform the method according to any one of the first aspect and the possible implementations of the first aspect.

DESCRIPTION OF EMBODIMENTS

To make the objectives, technical solutions, and advantages of this application clearer, the following further describes this application in detail with reference to the accompanying drawings. Apparently, the described embodiments are merely some rather than all of various embodiments. All other embodiments obtained by persons of ordinary skill in the art based on various embodiments without creative efforts shall fall within the protection scope of this application.

In various embodiments, a weight of a CRS wide beam is superposed with a weight of a narrow beam to obtain a composite beam, and beamforming processing is performed on a PDCCH based on a weight of the composite beam, to expand coverage of the PDCCH in a particular direction, and resolve a problem of deterioration of demodulation performance of the PDCCH that is caused when the coverage of the PDCCH in the particular direction exceeds coverage of a CRS beam and phases of the PDCCH and a CRS are inconsistent.

In an existing network, to ensure that coverage of a cell common control channel is wide enough, wide beam weighting is performed on a cell CRS. A CRS wide beam in this application is defined based on a CRS wide beam in the prior art.

Embodiments may be applied to a Long Term Evolution (Long Term Evolution, LTE) system and a subsequently evolved system, for example, a wireless communications system in a standard such as 5G (the 5th Generation mobile communication, the 5th Generation mobile communication), Universal Mobile Telecommunications System (Universal Mobile Telecommunications System, UMTS), or Global System for Mobile Communications (Global System for Mobile Communications, GSM), or may be applied to a communications system requiring beamforming.

A network device to which the solutions provided in various embodiments are applied is usually a base station in a wireless communications system. The base station may include various forms of macro base stations, micro base stations, relay nodes, access points, RRUs, or the like. In different systems, names of devices having a function of a base station may vary. For example, in an LTE network, the device is referred to as an evolved NodeB (evolved NodeB, eNB or eNodeB), and in a 3G (the 3rd Generation, the 3rd Generation) network, the device is referred to as a NodeB (NodeB).

As shown in FIG. 2, a system architecture to which various embodiments are applied includes a base station 201 and a terminal 202. The base station 201 is an apparatus deployed in a radio access network and configured to provide a wireless communication function for the terminal. The base station 201 may include various forms of macro base stations, micro base stations, relay nodes, access points, and the like. The terminal 202 communicates with the base station 201 and is scheduled by the base station 201.

Optionally, various embodiments are applied to an application scenario of massive MIMO. The application scenario described in various embodiments is intended to describe the technical solutions in various embodiments more clearly, and does not constitute limitations on the technical solutions provided in various embodiments. Persons of ordinary skill in the art may learn that, as a network architecture evolves and a new service scenario appears, the technical solutions provided in various embodiments are also applicable to a similar technical problem.

Unless otherwise stated, ordinal numerals such as "first" and "second" mentioned in various embodiments are used to distinguish between a plurality of objects and are not intended to limit an order of the plurality of objects.

A beamforming method and apparatus provided in various embodiments are described in detail below with reference to the accompanying drawings.

Figure 3:
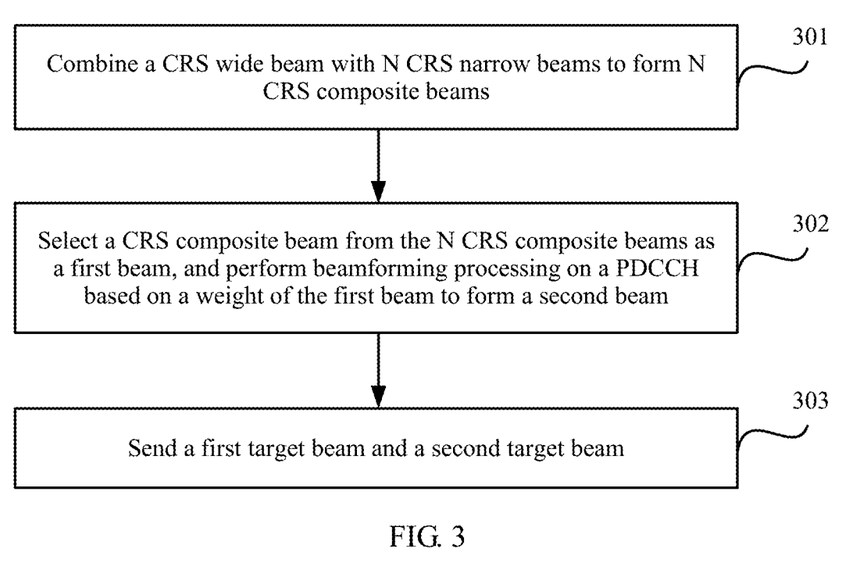
FIG. 3 is a schematic flowchart of a beamforming method according to an embodiment of this application.

Referring to FIG. 3, in an embodiment of this application, a procedure of a beamforming method is described as follows:

Step 301: A base station combines a CRS wide beam with N CRS narrow beams to form N CRS composite beams, where N≥1 and N is a positive integer.

In some embodiments, before forming the N CRS composite beams through composition, the base station pre-generates the N CRS narrow beams based on a weight of the cell CRS wide beam. Optionally, directions of all of the N CRS narrow beams are different.

The base station combines each pre-generated CRS narrow beam with the CRS wide beam. In some embodiments, any CRS narrow beam may be combined with the CRS wide beam in, but not limited to, the following manner: setting a power ratio of the CRS narrow beam to the CRS wide beam; setting a first linear factor and a second linear factor based on the power ratio; performing linear superposition on a weight of the CRS narrow beam and the weight of the CRS wide beam based on the first linear factor and the second linear factor, to obtain a weight of a CRS composite beam; and generating the CRS composite beam based on the weight of the CRS composite beam.

Directions of all the N pre-generated CRS narrow beams are different. Linear superposition is performed on each of CRS narrow beams in different directions and the CRS wide beam to obtain composite beams in the different directions. Coverage of each composite beam can be controlled by controlling a power ratio of each CRS narrow beam to the CRS wide beam after the superposition.

Step 302: The base station selects a CRS composite beam from the N CRS composite beams as a first beam, and performs beamforming processing on a PDCCH based on a weight of the first beam to form a second beam.

A weight includes a direction, strength, a phase and/or any other factors. When the second beam of the PDCCH channel and the first beam of a CRS are sent, because a weight of the PDCCH is the same as a weight of the CRS composite beam, a phase of the PDCCH received by a terminal is consistent with a phase of the CRS, thereby improving demodulation performance of the PDCCH, and avoiding a phase difference during demodulation of the PDCCH that is caused because the phase of the PDCCH is estimated by using the phase of the CRS when the phase of the PDCCH is inconsistent with the phase of the CRS. In prior art, when the PDCCH is sent, the phase difference can be compensated for, but estimation and calculation of the phase difference are greatly affected by a channel condition of the terminal, and it is difficult to accurately estimate the phase difference. Consequently, performance of demodulating the PDCCH by the terminal deteriorates. This application can resolve the foregoing problem.

Step 303: The base station sends the first beam and the second beam.

In some embodiments, the first beam may be selected from the N CRS composite beams in, but not limited to, the following two manners.

Manner 1: The base station determines a correspondence between any terminal in at least one to-be-scheduled terminal and a CRS narrow beam; and selects a first terminal (which may also be referred to as a target terminal) with worst PDCCH signal quality from the to-be-scheduled terminal, and determines, based on the correspondence, a first CRS narrow beam (which may also be referred to as a target CRS narrow beam) corresponding to the first terminal. The to-be-scheduled terminal has service data to be sent.

A CRS composite beam formed by combining the target CRS narrow beam with the CRS wide beam is used as a target CRS composite beam. Alternatively, after the first CRS narrow beam is determined, target reference signal received power (Reference Signal Received Power, RSRP) of the target terminal may be determined based on a PDCCH demodulation threshold. A power ratio of the target CRS narrow beam to the CRS wide beam when the target CRS composite beam is formed through combination is adjusted until RSRP of the target terminal on the target CRS composite beam is greater than or equal to the target RSRP. The target CRS composite beam obtained after the adjustment is used as the first beam. In an application scenario of a massive MIMO technology, a capacity and coverage of a PDSCH are greatly expanded. If the terminal sends service data by using the PDSCH, in most cases, scheduling needs to be performed by using the PDCCH. Therefore, if coverage of the PDCCH cannot be expanded, expanding of the capacity of the PDSCH cannot be ensured. In Manner 1, a coverage gain obtained within the first beam by the terminal with the worst PDCCH signal quality in the to-be-scheduled terminal is increased, so that an entire system service capacity can be expanded. Because beam superposition has relatively small impact in another direction, a terminal outside coverage of the first beam is not greatly affected.

In one implementation, when determining the correspondence between the any terminal in the at least one to-be-scheduled terminal and the CRS narrow beam, the base station calculates signal strength of the any terminal on each CRS composite beam, and determines that there is a correspondence between the any terminal and a CRS narrow beam for forming a CRS composite beam corresponding to maximum signal strength.

In some embodiments, the following operations are performed on each terminal in a set of to-be-scheduled terminals: obtaining a channel response; calculating RSRP of the terminal on each CRS composite beam based on the channel response and a weight of each CRS composite beam to obtain N RSRP values; selecting a maximum value from the N RSRP values; and determining that there is a correspondence between the terminal and a CRS narrow beam for forming a CRS composite beam corresponding to the maximum value.

In one implementation, when a correspondence between a terminal in the set of to-be-scheduled terminals and a CRS narrow beam is determined, the following operations are performed on each terminal in the set of to-be-scheduled terminals: calculating an angle of arrival DOA (Direction Of Arrival) of the terminal, and selecting a narrow beam whose azimuth is closest to the angle of arrival as a CRS narrow beam having a correspondence with the terminal.

Manner 2: PDCCH occupation resources that are of each CRS composite beam and that are used for a to-be-scheduled terminal are calculated, and a CRS composite beam corresponding to minimum PDCCH occupation resources is selected as the first beam.

In some embodiments, the N CRS composite beams are successively traversed, and each time one CRS composite beam is selected; a difference between first PDCCH occupation resources that are of the selected CRS composite beam and that are used for all terminals in to-be-scheduled terminals and second PDCCH occupation resources that are of the CRS wide beam and that are used for all the terminals in the to-be-scheduled terminals is calculated, to obtain N differences; and a CRS composite beam corresponding to a maximum value in the N differences is used as the first beam. In this way, within coverage of the first beam and the second beam, all the to-be-scheduled terminals occupy minimum first PDCCH occupation resources. In a system, if the terminal sends service data by using a PDSCH, in most cases, the terminal needs to be scheduled by using the PDCCH, but a total quantity of PDCCHs in a cell is limited, and in an application scenario of a massive MIMO technology, a quantity of to-be-scheduled terminals is greatly increased. In Manner 2, PDCCH resources occupied by a scheduled terminal are reduced, so that a total quantity of scheduled terminals can be increased, thereby expanding a PDCCH capacity of the system.

When the first PDCCH occupation resources that are of the selected CRS composite beam and that are used for all the terminals in the to-be-scheduled terminals are calculated, the following is performed on each terminal in the set of to-be-scheduled terminals: obtaining a channel response; calculating first RSRP of the terminal on the CRS wide beam based on the channel response; calculating second RSRP of the terminal on the selected CRS composite beam based on the channel response and a weight of the selected CRS composite beam; calculating, based on the first RSRP and the second RSRP, a beam gain obtained by the terminal on the selected CRS composite beam; and calculating, based on the obtained beam gain, the first PDCCH occupation resources that are of the selected CRS composite beam and that are used for all the terminals in the set of to-be-scheduled terminals.

Because the terminal has mobility, a correspondence between a terminal and a CRS narrow beam is not fixed. Optionally, in this embodiment of this application, a CRS composite beam is reselected from the N CRS composite beams as the first beam based on a specified period. A selection manner is the same as the foregoing method. Optionally, an update is performed within each transmission time interval (Transmission Time Interval, TTI).

Figure 4:
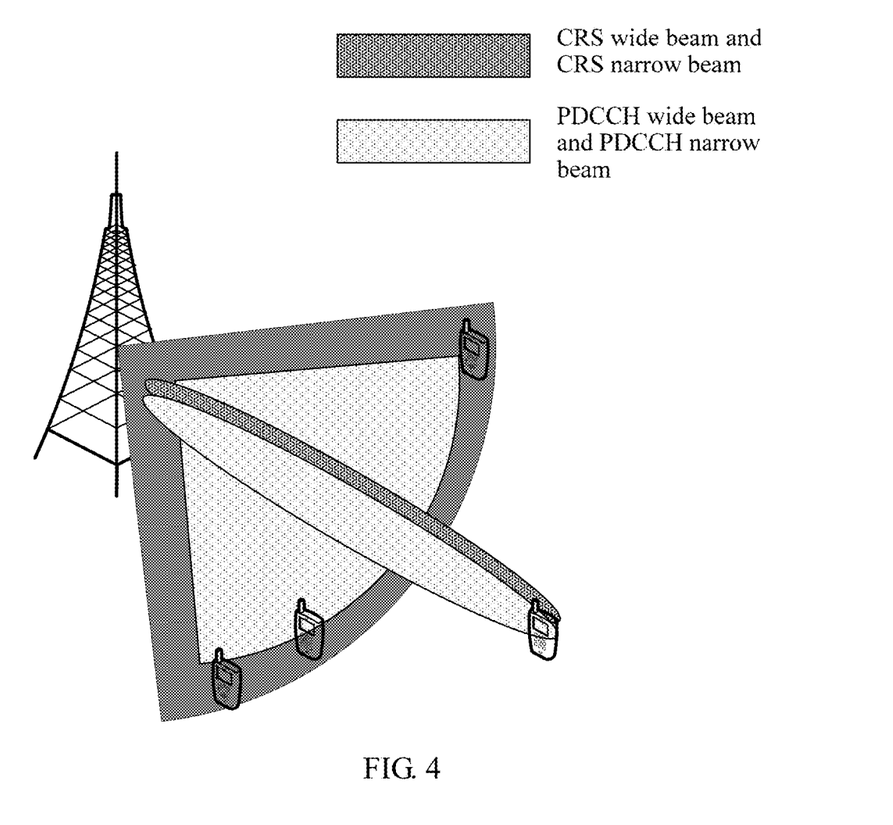
FIG. 4 is a schematic diagram of coverage of CRS wide and narrow superposed beams and PDCCH wide and narrow superposed beams according to an embodiment of this application.
Figure 5A:
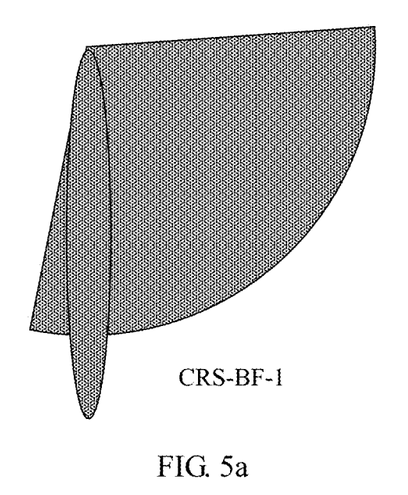
FIG. 5a to FIG. 5f are schematic diagrams of pre-generating a CRS narrow beam according to an embodiment of this application.
Figure 5B:
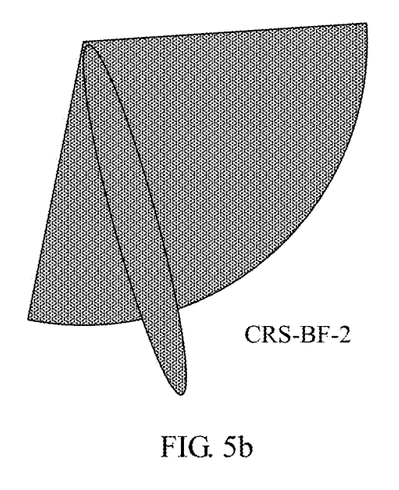
Figure 5C:
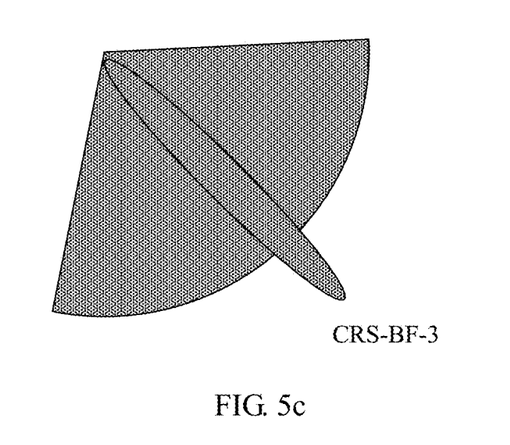
Figure 5D:
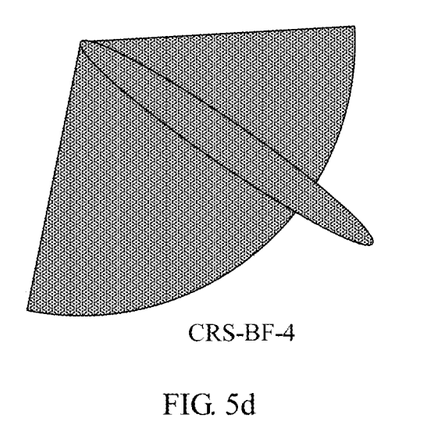
Figure 5E:
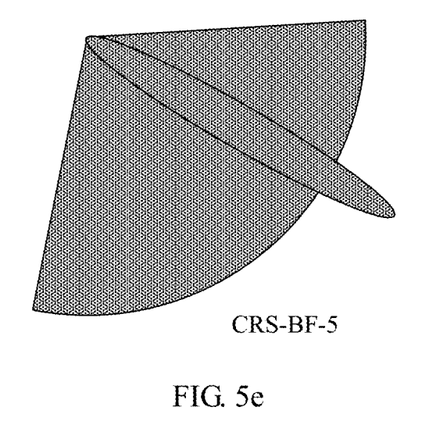
Figure 5F:
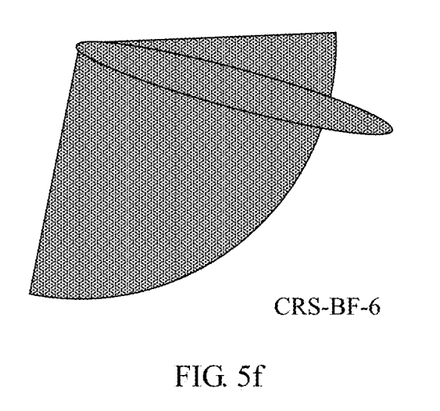

The solution provided in this embodiment is further described in detail below with reference to an application scenario. Using an application scenario of massive MIMO as an example, for a scenario that is shown in FIG. 1 and in which coverage of a CRS and coverage of a PDCCH are limited, a basic idea of this embodiment is shown in FIG. 4. For a terminal outside the coverage of the CRS and the coverage of the PDCCH, a weight of a CRS wide beam is superposed with a weight of a narrow beam to form a CRS composite beam. Coverage of the CRS composite beam exceeds coverage of the CRS wide beam in a particular direction shown in FIG. 4. In addition, weighting is performed on the PDCCH by using a weight of the CRS composite beam, so that the PDCCH obtains coverage the same as that of the CRS, thereby improving performance of demodulating the PDCCH by the terminal outside the original coverage of the CRS and the original coverage of the PDCCH, and expanding the coverage of the CRS and the coverage of the PDCCH. Further, based on expanding of the coverage of the CRS and the coverage of the PDCCH, two manners of determining the CRS composite beam are designed. The CRS wide beam is superposed with CRS narrow beams in different directions to form different CRS composite beams. According to a principle that minimum control channel elements (Control Channel Element, CCE) are consumed, an optimal CRS composite beam is selected, thereby reducing PDCCH resource consumption, and expanding an overall PDCCH capacity of the system. Alternatively, according to a principle that a PDCCH coverage gain is obtained by a terminal with worst PDCCH signal quality, an optimal CRS composite beam is selected.

For ease of display, a PDSCH beam is not shown in FIG. 4.

In some embodiments, as shown in FIG. 5a to FIG. 5f, assuming that a coverage angle of a CRS wide beam is 120°, the coverage angle of the CRS wide beam is evenly divided into coverage of N areas, for example, N=6, and one CRS narrow beam is pre-generated in each area. The CRS narrow beams are respectively denoted as CRS-BF-1, CRS-BF-2, . . . , and CRS-BF-6. After the CRS wide beam is separately superposed with the narrow beams in the six directions, six CRS composite beams are generated, and coverage of each CRS composite beam in a corresponding particular direction is enhanced.

It is assumed that a weight of the CRS wide beam and weights of the six CRS narrow beams are respectively $W_{CRS}$, $W_{narrow\_1}$, $W_{narrow\_2}$, $W_{narrow\_3}$, $W_{narrow\_4}$, $W_{narrow\_5}$, and $W_{narrow\_6}$. The CRS wide beam is superposed with CRS narrow beams in different directions to obtain CRS composite beams in the different directions. Coverage of a CRS composite beam in a corresponding particular direction is controlled by controlling a power ratio of a CRS narrow beam to the CRS wide beam after the superposition. A factor of the power ratio of the CRS narrow beam to the CRS wide beam is set to $P_{ratio}$, and a weight of the CRS composite beam is: $W_{surplus}=(1-P_{ratio}) \times W_{CRS} P_{ratio} \times W_{narrow\_1}$. A value of $P_{ratio}$ ranges from 0 to 0.9. It can be learned that, a larger $P_{ratio}$ indicates a larger beam gain of the CRS composite beam in the particular direction, and a smaller $P_{ratio}$ indicates a smaller beam gain of the composite beam in the particular direction.

After the CRS composite beams in the six different directions are pre-generated, a CRS composite beam needs to be selected as a target CRS composite beam for sending, and beamforming is performed on a PDCCH by using a weight of the target CRS composite beam. Two selection manners are specifically described below:

Manner 1:

1. All terminals in a to-be-scheduled queue are selected as a set of candidate terminals.

2. For each terminal in the set of terminals, a channel response is obtained by using an uplink SRS, RSRP of the terminal on each CRS composite beam is calculated based on weights of the six pre-generated CRS composite beams, and a maximum value is selected from the obtained RSRP and denoted as RSRP_max. It is determined that there is a correspondence between the terminal and a CRS narrow beam for forming a CRS composite beam corresponding to the maximum RSRP value.

3. In the set of candidate terminals, a terminal with service data and with a worst PDCCH signal quality is selected from the to-be-scheduled terminals as a target terminal, and a CRS narrow beam corresponding to the target terminal is used as a target narrow beam.

4. Target received RSRP RSRP_target of the target terminal may be determined based on a PDCCH demodulation threshold, and a power ratio of a target CRS narrow beam to the CRS wide beam when the target CRS composite beam is formed through combination is adjusted until RSRP_max is greater than or equal to RSRP_target.

This ensures that the terminal with the worst PDCCH signal quality is not limited within coverage of the selected target CRS composite beam.

5. Weighting is performed on the PDCCH by using the weight of the target CRS composite beam.

Therefore, the PDCCH obtains beam coverage the same as that of the CRS, and the coverage is enhanced by using a PDCCH narrow beam, thereby improving performance of demodulating the PDCCH by the target terminal.

Within each TTI, the foregoing steps 2 to 5 are repeated to track a location of the terminal.

Manner 2:

(1) CRS composite beams are selected one by one in a particular order.

(2) Each time one CRS composite beam is selected, the following is performed on each terminal in a set of to-be-scheduled terminals: obtaining a channel response by using an uplink SRS; calculating RSRP_com of the terminal on the CRS composite beam based on a weight of the CRS composite beam; calculating RSRP_wide of the terminal on the CRS wide beam based on the channel response; and calculating a beam gain of the terminal within the CRS composite beam: BF_gain=RSRP_com−RSRP_wide.

In this manner, the beam gain BF_gain of each terminal in the set of to-be-scheduled terminals within the corresponding CRS composite beam is obtained.

(3) The following is performed on each terminal in the set of to-be-scheduled terminals: calculating an initial CCE aggregation level CCE_aggLev_init after the terminal performs PDCCH wide beam weighting, calculating an adjusted CCE aggregation level CCE_aggLev_adj after the beam gain is obtained, and calculating a quantity of reduced CCEs: CCE_aggLev_init−CCE_aggLev_adj.

(4) Quantities of reduced CCEs after all the terminals in the to-be-scheduled set obtain the beam gain are calculated.

(5) Step (2) to step (4) are repeated until all the CRS composite beams are traversed.

(6) A CRS composite beam corresponding to a maximum value in the quantities of reduced CCEs is selected as the target CRS composite beam.

Based on the foregoing step (1) to step (6), minimum CCEs are occupied on the PDCCH in the system, thereby expanding a capacity of the PDCCH.

Figure 6:
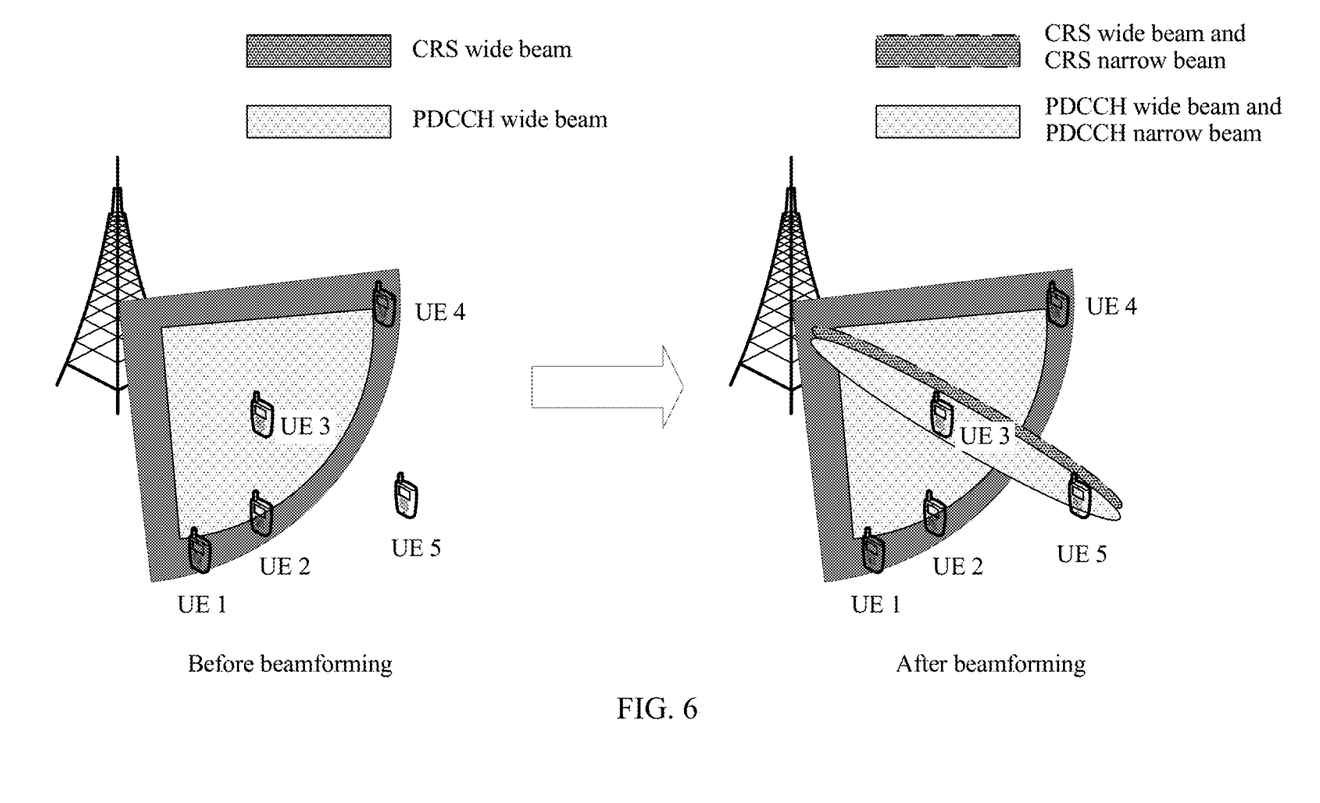
FIG. 6 is a schematic comparison diagram before and after beamforming is performed on a CRS and a PDCCH according to an embodiment of this application.

An example is used below for description. FIG. 6 shows impact on a PDCCH capacity before and after beamforming is performed on a CRS and a PDCCH.

In FIG. 6, there are five terminals in a cell that are respectively denoted as UE 1, UE 2, UE 3, UE 4, and UE 5. The UE 1, the UE 2, and the UE 4 are located on an edge of the cell, the UE 3 is located in a center of the cell, and the UE 5 is most distant from the cell.

When wide beam weighting is performed on both the CRS and the PDCCH, each of the UE 1, the UE 2, and the UE 4 that are located on the edge of the cell occupies four CCEs in total, the UE 3 located in the center of the cell occupies two CCEs, and the UE 5 that is far away from the cell occupies eight CCEs. An actual quantity of CCEs consumed on the PDCCH is 3×4+2+8=22.

When superposition of a weight of a wide beam with a weight of a narrow beam is performed on both the CRS and the PDCCH, if a narrow beam is aligned with a direction of the UE 3 and the UE 5, assuming that a beam gain on the narrow beam is 3 dB, each of the UE 1, the UE 2, and the UE 4 that are located on the edge of the cell occupies four CCEs in total, the UE 3 located in the center of the cell obtains the gain of 3 dB and occupies one CCE, and the UE 5 that is far away from the cell occupies four CCEs after obtaining the gain of 3 dB. An actual quantity of CCEs consumed on the PDCCH is 3×4+1+4=17. It can be learned that, when a wide beam is superposed with a narrow beam for the CRS and the PDCCH, use of CCEs on the PDCCH is reduced by 22−17/22=22.7%, thereby expanding a capacity of the PDCCH.

Figure 7:
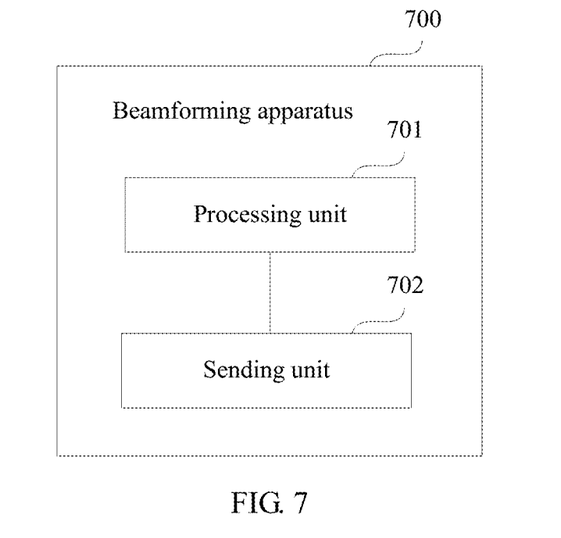
FIG. 7 is a schematic structural diagram of a beamforming apparatus according to an embodiment of this application.

Based on a same invention idea as the beamforming method shown in FIG. 3, as shown in FIG. 7, an embodiment of this application further provides a beamforming apparatus 700. The beamforming apparatus 700 may be configured to perform the method shown in FIG. 3. The beamforming apparatus 700 includes:

a processing unit 701, configured to combine a cell-specific reference signal CRS wide beam with N CRS narrow beams to form N CRS composite beams, where the N CRS narrow beams are pre-generated by the processing unit 701 based on a weight of the CRS wide beam, N≥1, and N is a positive integer, where the processing unit 701 is further configured to: select a first beam from the N CRS composite beams obtained by the processing unit 701 through combination, and perform beamforming processing on a physical downlink control channel PDCCH based on a weight of the first beam to form a second beam; and a sending unit 702, configured to send the first beam and the second beam.

Optionally, the processing unit 701 is configured to:

determine a correspondence between any terminal in at least one to-be-scheduled terminal and a CRS narrow beam;

select a first terminal with worst PDCCH signal quality from the at least one terminal, and determine, based on the correspondence, a first CRS narrow beam corresponding to the first terminal; and select, as the first beam, a CRS composite beam formed by combining the first CRS narrow beam with the CRS wide beam.

Optionally, the processing unit 701 is configured to:

calculate signal strength of the any terminal on each CRS composite beam, and determine that there is a correspondence between the any terminal and a CRS narrow beam for forming a CRS composite beam corresponding to maximum signal strength.

Optionally, the processing unit 701 is configured to:

calculate, by the base station, PDCCH occupation resources that are of each CRS composite beam and that are used for the at least one terminal; and select, by the base station, a CRS composite beam corresponding to minimum PDCCH occupation resources as the first beam.

Optionally, the processing unit 701 is configured to:

calculate a beam gain obtained by each of the at least one terminal on the any CRS composite beam; and calculate, based on the obtained beam gain, PDCCH occupation resources that are of the any CRS composite beam and that are used for all terminals in the at least one terminal.

Optionally, the processing unit 701 is further configured to:

reselect, as the first beam, a CRS composite beam from the N CRS composite beams based on a specified period.

Figure 8:
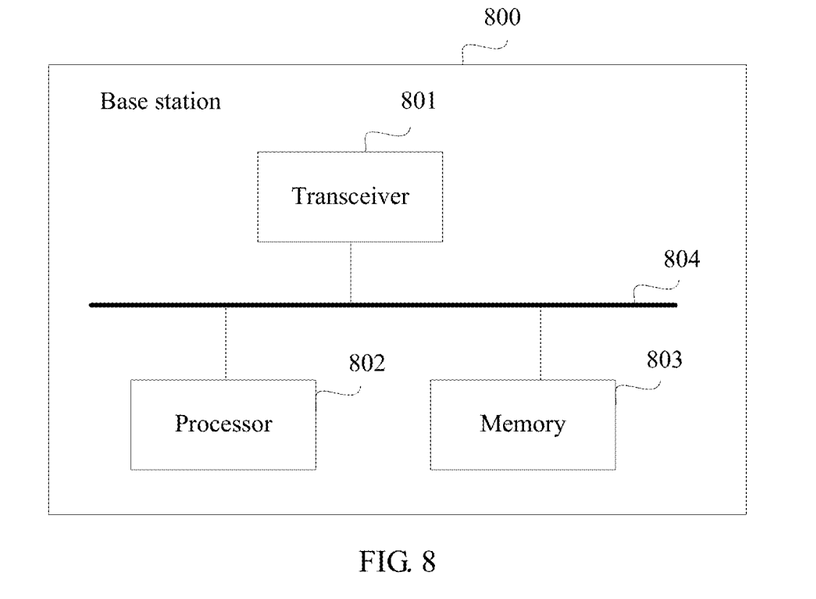
FIG. 8 is a schematic structural diagram of a base station according to an embodiment of this application.

Based on a same invention idea as the beamforming method shown in FIG. 3, referring to FIG. 8, an embodiment of this application further provides a base station 800. The base station 800 may be configured to perform the method shown in FIG. 3. The base station 800 includes a transceiver 801, a processor 802, a memory 803, and a bus 804. The processor 802 is connected to the memory 803 through the bus system 804. The processor 802 is configured to execute code in the memory 803, and when the code is executed, the processor performs the following operations:

combining a cell-specific reference signal CRS wide beam with N CRS narrow beams to form N CRS composite beams, where the N CRS narrow beams are pre-generated based on a weight of the CRS wide beam, N≥1, and N is a positive integer;

selecting a first beam from the N CRS composite beams formed through combination, and performing beamforming processing on a physical downlink control channel PDCCH based on a weight of the first beam to form a second beam; and sending the first beam and the second beam by using the transceiver 801.

Optionally, the processor 802 is configured to:

determine a correspondence between any terminal in at least one to-be-scheduled terminal and a CRS narrow beam;

select a first terminal with worst PDCCH signal quality from the at least one terminal, and determine, based on the correspondence, a first CRS narrow beam corresponding to the first terminal; and select, as the first beam, a CRS composite beam formed by combining the first CRS narrow beam with the CRS wide beam.

Optionally, the processor 802 is configured to:

calculate signal strength of the any terminal on each CRS composite beam, and determine that there is a correspondence between the any terminal and a CRS narrow beam for forming a CRS composite beam corresponding to maximum signal strength.

Optionally, the processor 802 is configured to:

calculate, by the base station, PDCCH occupation resources that are of each CRS composite beam and that are used for the at least one terminal; and select, by the base station, a CRS composite beam corresponding to minimum PDCCH occupation resources as the first beam.

Optionally, the processor 802 is configured to:

calculate a beam gain obtained by each of the at least one terminal on the any CRS composite beam; and calculate, based on the obtained beam gain, PDCCH occupation resources that are of the any CRS composite beam and that are used for all terminals in the at least one terminal.

Optionally, the processor 802 is further configured to:

reselect, as the first beam, a CRS composite beam from the N CRS composite beams based on a specified period.

The processor 802 may be a central processing unit (English: central processing unit, CPU for short), a network processor (English: network processor, NP for short), or a combination of a CPU and an NP.

The processor 802 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field programmable gate array (English: field programmable gate array, FPGA for short), a generic array logic (English: generic array logic, GAL for short), or any combination thereof.

The memory 803 may include a volatile memory (English: volatile memory), such as a random access memory (English: random access memory, RAM for short); or the memory 803 may include a non-volatile memory (English: non-volatile memory), such as a flash memory (English: flash memory), a hard disk drive (English: hard disk drive, HDD for short), or a solid-state drive (English: solid-state drive, SSD for short); or the memory 803 may include a combination of the foregoing types of memories.

It should be noted that, the apparatus provided in FIG. 7 may be configured to implement the method shown in FIG. 3. In a specific implementation, the processing unit 701 in FIG. 7 may be implemented by the processor 802 in FIG. 8, and the sending unit 702 may be implemented by the transceiver 801 in FIG. 8.

Persons skilled in the art should understand that various embodiments may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or the block diagrams of the method, the device (system), and the computer program product according to various embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to various embodiments without departing from the spirit and scope of various embodiments. In this way, this application is intended to cover these modifications and variations made to various embodiments provided that they fall within the scope of protection defined by the following claims and their equivalent technologies of this application.

What is claimed is:

1. A beamforming method, comprising:
    combining, by a base station, a cell-specific reference signal CRS wide beam with N CRS narrow beams to form N CRS composite beams, wherein the N CRS narrow beams are pre-generated based on a weight of the CRS wide beam, N≥1, and N is a positive integer;
    selecting, by the base station, a first beam from the N CRS composite beams;
    performing, by the base station, beamforming processing on a physical downlink control channel (PDCCH) based on a weight of the first beam to form a second beam; and
    sending, by the base station, the first beam and the second beam; and, wherein selecting, by the base station, the first beam from the N CRS composite beams comprises:
    determining, by the base station, a correspondence between any terminal in at least one to-be-scheduled terminal and a CRS narrow beam;
    selecting, by the base station, a first terminal with a worst PDCCH signal quality from the at least one terminal, and determining that, based on the correspondence, a first CRS narrow beam corresponds to the first terminal; and
    selecting, by the base station, as the first beam, a CRS composite beam formed by combining the first CRS narrow beam with the CRS wide beam.

2. The method according to claim 1, wherein determining, by the base station, the correspondence between any terminal in at least one to-be-scheduled terminal and a CRS narrow beam comprises:
    calculating signal strength of the any terminal on each CRS composite beam, and determining that there is a correspondence between the any terminal and a CRS narrow beam for forming a CRS composite beam corresponding to a maximum signal strength.

3. The method according to claim 1, wherein selecting, by the base station, the first beam from the N CRS composite beams comprises:
    calculating, by the base station, PDCCH occupation resources of each CRS composite beam used for the at least one terminal; and
    selecting, by the base station, a CRS composite beam having a minimum amount of PDCCH occupation resources among the N CRS composite beams as the first beam.

4. The method according to claim 3, wherein calculating, by the base station, PDCCH occupation resources of any CRS composite beam used for the at least one terminal comprises:
    calculating a beam gain obtained by each of the at least one terminal on the any CRS composite beam; and
    calculating, by the base station based on the obtained beam gain, PDCCH occupation resources that are of the any CRS composite beam and that are used for all terminals in the at least one terminal.

5. The method according to claim 1, further comprising:
    reselecting, by the base station as the first beam, a CRS composite beam from the N CRS composite beams based on a specified period.

6. A beamforming apparatus, comprising:
    processor, configured to:
    combine a cell-specific reference signal CRS wide beam with N CRS narrow beams to form N CRS composite beams, wherein the N CRS narrow beams are pre-generated by the processing unit based on a weight of the CRS wide beam, N≥1, and N is a positive integer;
    select a first beam from the N CRS composite beams; and
    perform beamforming processing on a physical downlink control channel (PDCCH) based on a weight of the first beam to form a second beam; and
    a transceiver, configured to send the first beam and the second beam; wherein the processor is further configured to:
    determine a correspondence between any terminal in at least one to-be-scheduled terminal and a CRS narrow beam;
    select a first terminal with a worst PDCCH signal quality from the at least one terminal, and determine that, based on the correspondence, a first CRS narrow beam corresponds to the first terminal; and
    select, as the first beam, a CRS composite beam formed by combining the first CRS narrow beam with the CRS wide beam.

7. The apparatus according to claim 6, wherein the processor is configured to:
    calculate signal strength of the any terminal on each CRS composite beam, and determine that there is a correspondence between the any terminal and a CRS narrow beam for forming a CRS composite beam corresponding to a maximum signal strength.

8. The apparatus according to claim 6, wherein the processor is configured to:
- calculate, by the base station, PDCCH occupation resources that are of each CRS composite beam and that are used for the at least one terminal; and
- select, by the base station, a CRS composite beam having a minimum amount of PDCCH occupation resources among the N CRS composite beams as the first beam.

9. The apparatus according to claim 8, wherein the processor is configured to:
- calculate a beam gain obtained by each of the at least one terminal on the any CRS composite beam; and
- calculate, based on the obtained beam gain, PDCCH occupation resources of the any CRS composite beam used for all terminals in the at least one terminal.

10. The apparatus according to claim 6, wherein the processor is further configured to:
- reselect, as the first beam, a CRS composite beam from the N CRS composite beams based on a specified period.

* * * * *